United States Patent [19]

Miller et al.

[11] 4,411,487

[45] Oct. 25, 1983

[54] DEVICE FOR SEEING THROUGH BATTLEFIELD SMOKES AND AEROSOLS

[75] Inventors: Thomas G. Miller, Madison; Robert G. Polk, Toney, both of Ala.

[73] Assignee: The United States of America as represented by the Secretary of the Army, Washington, D.C.

[21] Appl. No.: 279,647

[22] Filed: Jul. 2, 1981

[51] Int. Cl.³ .................. G02B 17/00; G02B 27/02
[52] U.S. Cl. ..................................... 350/1.1; 350/321
[58] Field of Search ..................... 350/1.1, 359, 321

[56] References Cited

U.S. PATENT DOCUMENTS 4,003,631   1/1977   Biet et al. .......................... 350/359

Primary Examiner—Bruce Y. Arnold
Attorney, Agent, or Firm—Robert P. Gibson; Anthony T. Lane; James T. Deaton

[57] ABSTRACT

A device for seeing through battlefield smokes or aerosols that utilizes a high power pulsed laser to burn or punch a hole through the smoke or aerosol and then utilize a thermal imaging device for viewing through the hole to determine objects being camouflaged by said smoke or aerosol screen.

4 Claims, 1 Drawing Figure

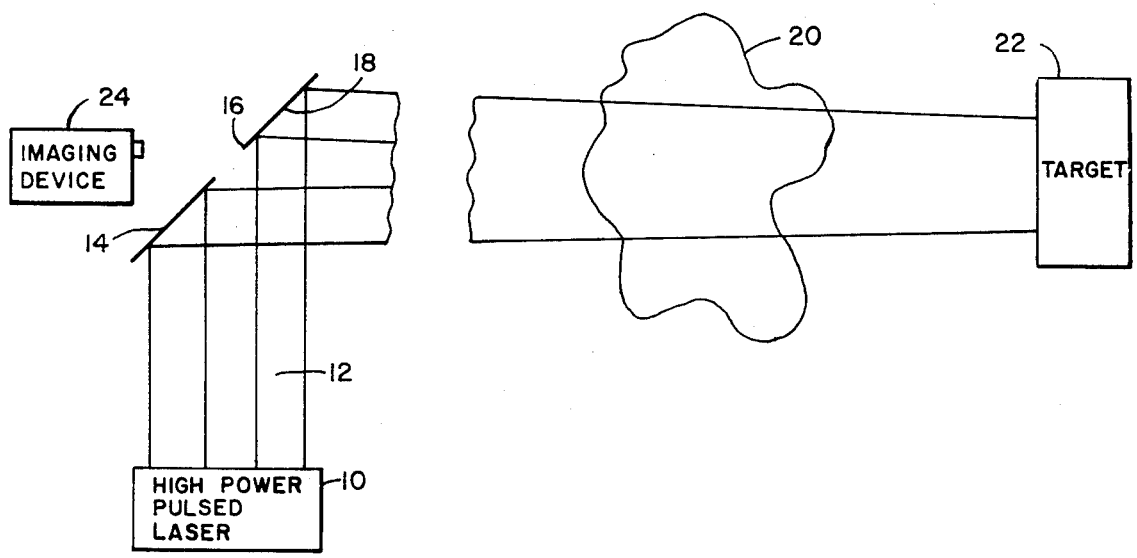

DEVICE FOR SEEING THROUGH BATTLEFIELD SMOKES AND AEROSOLS

DEDICATORY CLAUSE

The invention described herein may be manufactured, used, and licensed by or for the Government for governmental purposes without the payment to us of any royalty thereon.

BACKGROUND OF THE INVENTION

It is known that modern battlefield tactics involve the use of battlefield smokes and aerosols to hide or conceal one's actions on the battlefield. The ability to "see" through a smoke screen or aerosol screen laid down by the friend or foe would be a tremendous asset. By determining the exact location of the enemies' forces and armor one can direct bombs, artillery or other weapons to the desired correct location. As the art of smokes and aerosols progresses, it becomes more and more difficult to "see" through the atmosphere with these elements therein. When one looks at transmission versus wavelength, one finds that the transmission at visible wavelengths is much less than the transmission at longer wavelengths, i.e., at 10.6 microns. Therefore, thermal imaging devices, flirs, are used more and more to "see" through battlefield atmospheres. But as the concentration of the aerosols or smokes in the atmosphere are increased beyond a given value, it becomes impossible even for thermal imaging devices to see through the aerosols or smokes. Therefore, there is a need for a device which is capable of punching or burning a hole through the aerosol or smoke clouds so that the transmission of the wavelength of interest can be increased and transmitted as needed.

Therefore, it is an object of this invention to provide a device which utilizes a high power laser energy source with means for directing the energy source in the direction in which it is desired to look and utilizing the energy source for punching or burning a hole through aerosol or smoke cloud cover.

Another object of this invention is to provide a device in which the reflecting means has a hole therein through which a thermal imaging device can be focused to look through the hole in the reflecting means and the hole punched by the high energy laser device.

Other objects and advantages of this invention will be obvious to those skilled in the art.

SUMMARY OF THE INVENTION

In accordance with this invention, a high energy laser source is provided that has an output with a hole therein and directed to a reflection means which reflects the laser energy to and through an aerosol cloud to punch or burn a hole therethrough and a thermal imaging device is used to look through the hole in the reflecting means and through the hole created in the aerosol to view beyond the aerosol cover. With this arrangement, one can view the enemy inside the aerosol cover or if one is using the aerosol for a cover he can view outside his own aerosol cover.

BRIEF DESCRIPTION OF THE DRAWING

The single FIGURE of the drawing is a schematic illustration of the device according to this invention.

DESCRIPTION OF THE PREFERRED EMBODIMENT

Referring now to the drawing, a high power pulsed laser 10 emits pulses 12 which have a hole in their center. Emitted laser pulses 12 are directed to tilted mirror 14 which has a hole 16 which corresponds with the hole in the laser pulses. Laser pulses 12 which strike reflective surface 18 are reflected downrange and through aerosol type cloud 20 to expose target 22. With the hole through cloud 20, a thermal imaging device 24, a laser range finder or other means for looking through hole 16 and the hole punched in aerosol cloud 20 is used for detecting or locating target 22 and for identification of target 22. High power laser 10 should have a power output of about 5,000 to about 10,000 joules per pulse and a high power $CO_2$ laser works well. Clouds 20 made from red phosphor or white phosphor have been sucessfully punched or penetrated by high power pulsed radiation as used in this invention. Also, a conventional IR imaging device 25 or other identification means such as even a laser can be focused through hole 16 and the hole punched in cloud cover 20 to identify and detect whatever is on the opposite side of cloud cover 20 to that of the laser and imaging device. It is also pointed out that aerosol cloud cover 20 may be around the enemy or cloud cover or camouflage 20 may be utiled around equipment such as the high powered laser 10 and other equipment. If aerosol cloud cover 20 is utilized to camouflage around one's environment, one will be able to punch a hole through the cloud easier since the aerosol cloud cover will be closer to the high power laser and also one will be able to view a greater area due to the hole in the cloud cover being closer to the imaging device.

In operation, when it is desired to view through an aerosol cloud cover or camouflage high power pulsed laser 10 is caused to produce output pulses 12 that are reflected off surface 18 of mirror 14 and through cloud cover 20 to punch an appropriate hole therethrough. With the hole in cloud cover 20, one views with imaging device 24 through opening 16 in mirror 14 and the hole punched in cloud cover 20 any equipment or personnel that may be located on the opposite side of cloud cover 20. By detecting and determining the exact location of an enemies' forces and their armor, one can direct bombs, artillery, or possibly other directed energy beams to the correct location. Therefore, it can be clearly understood that this device is very usefuly when aerosol cloud cover camouflage type tactics are being used in the field.

We claim:

1. A device for seeing through an aerosol cloud cover comprising a high power laser source which produces a laser output that is directed to a mirror and reflected off the surface of said mirror and through said aerosol cloud cover to produce a hole therein, and viewing means aligned with a hole in said mirror and viewing through said hole in said mirror and the hole produced in said cloud cover for viewing objects camouflaged by said cloud cover.

2. A device as set forth in claim 1, wherein said high power laser is a pulsed $CO_2$ laser and the output from said laser having a hole at its center with the laser output being projected on said mirror and around said hole in said mirror.

3. A device as set forth in claim 1, wherein said viewing means is a thermal imaging device of the infrared type.

4. A device as set forth in claims 2 or 3, wherein said laser has an output of about 5,000 to about 10,000 joules per pulse.

* * * * *